(12) United States Patent
Konishi

(10) Patent No.: US 11,816,270 B2
(45) Date of Patent: Nov. 14, 2023

(54) ELECTRONIC DEVICE THAT OPERATES ACCORDING TO USER'S HAND GESTURE, AND IMAGE FORMING APPARATUS

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 108 days.

(21) Appl. No.: 17/532,444

(22) Filed: Nov. 22, 2021

(65) Prior Publication Data
US 2022/0171468 A1 Jun. 2, 2022

(30) Foreign Application Priority Data

Dec. 1, 2020 (JP) ................................ 2020-199779

(51) Int. Cl.
G06F 3/01 (2006.01)
G06F 3/0486 (2013.01)
G06F 3/0488 (2022.01)
H04N 1/00 (2006.01)

(52) U.S. Cl.
CPC ............ *G06F 3/017* (2013.01); *G06F 3/0486* (2013.01); *G06F 3/0488* (2013.01); *H04N 1/00381* (2013.01)

(58) Field of Classification Search
CPC ...... G06F 3/017; G06F 3/0488; G06F 3/0486; H04N 1/00381
See application file for complete search history.

(56) References Cited

U.S. PATENT DOCUMENTS

| 10,990,240 | B1* | 4/2021 | Ravasz | G06F 3/011 |
| 11,221,680 | B1* | 1/2022 | Clements | G06F 3/017 |
| 2011/0193778 | A1* | 8/2011 | Lee | G06F 3/017 345/158 |
| 2013/0265218 | A1* | 10/2013 | Moscarillo | G06F 3/04886 345/156 |
| 2013/0283213 | A1* | 10/2013 | Guendelman | G06F 3/0485 715/848 |
| 2013/0293454 | A1* | 11/2013 | Jeon | G06F 3/0481 345/156 |
| 2015/0220149 | A1* | 8/2015 | Plagemann | G06F 3/017 715/856 |

(Continued)

FOREIGN PATENT DOCUMENTS

JP 2010-237766 A 10/2010

*Primary Examiner* — Ting Z Lee
(74) *Attorney, Agent, or Firm* — IP BUSINESS SOLUTIONS, LLC

(57) ABSTRACT

An image forming apparatus includes a camera that shoots a user's hand raised up in the air, a HDD containing a plurality of hand gestures including actions of the specific finger making contact with another finger, and commands respectively associated with the plurality of hand gestures, a hand gesture recognizer that recognizes the hand gesture, from a plurality of shot images sequentially acquired from the camera, a command acquirer that acquires the command associated with the hand gesture recognized by the hand gesture recognizer, from the HDD, and a controller that performs an operation according to the command acquired by the command acquirer, on the position of a cursor on a screen of a display device.

2 Claims, 12 Drawing Sheets

| | HAND GESTURE | | COMMAND |
|---|---|---|---|
| | MOTION LOCUS | NAME | |
| 1 | LOCUS REPRESENTING MOTION INCLUDING MAKING INDEX FINGER AND THUMB CONTACT AND PART FROM EACH OTHER | CLICK HAND GESTURE | CLICK OPERATION |
| 2 | LOCUS REPRESENTING MOTION INCLUDING MAKING INDEX FINGER AND THUMB QUICKLY CONTACT AND PART FROM EACH OTHER TWICE | DOUBLE CLICK HAND GESTURE | DOUBLE CLICK OPERATION |
| 3 | LOCUS REPRESENTING MOTION INCLUDING KEEPING INDEX FINGER AND THUMB IN CONTACT WITH EACH OTHER AND UNMOVED, FOR PREDETERMINED TIME OR LONGER, AND THEN SEPARATING INDEX FINGER AND THUMB FROM EACH OTHER | HOLD-DOWN HAND GESTURE | HOLDING-DOWN OPERATION |
| 4 | LOCUS REPRESENTING MOTION INCLUDING MAKING INDEX FINGER AND THUMB CONTACT EACH OTHER AND MOVING HAND TO TARGET POSITION KEEPING INDEX FINGER AND THUMB IN CONTACT, AND SEPARATING INDEX FINGER AND THUMB FROM EACH OTHER AT TARGET POSITION | DRAG-AND-DROP HAND GESTURE | DRAG-AND-DROP OPERATION |
| 5 | LOCUS REPRESENTING MOTION INCLUDING MAKING INDEX FINGER AND THUMB CONTACT EACH OTHER, AND SLIDING EITHER FINGER IN SLIDE DIRECTION | SWIPE HAND GESTURE | SWIPING OPERATION |
| 6 | LOCUS REPRESENTING MOTION INCLUDING MAKING INDEX FINGER, THUMB, AND MIDDLE FINGER CONTACT EACH OTHER, AND SEPARATING ONLY INDEX FINGER | PINCH-OUT HAND GESTURE | PINCHING-OUT OPERATION |
| 7 | LOCUS REPRESENTING MOTION INCLUDING MAKING THUMB AND MIDDLE FINGER CONTACT EACH OTHER, AND BRINGING INDEX FINGER CLOSE TO OR INTO CONTACT WITH THUMB OR MIDDLE FINGER | PINCH-IN HAND GESTURE | PINCHING-IN OPERATION |
| 8 | LOCUS REPRESENTING MOTION INCLUDING MAKING THUMB AND MIDDLE FINGER CONTACT EACH OTHER, AND ROTATING WRIST TO RIGHT OR LEFT KEEPING INDEX FINGER SEPARATED FROM THUMB AND MIDDLE FINGER | ROTATE HAND GESTURE | ROTATING OPERATION |

TB1

(56) References Cited

U.S. PATENT DOCUMENTS

| | | | | |
|---|---|---|---|---|
| 2016/0124513 | A1* | 5/2016 | Dal Zot | G06F 3/0304 715/863 |
| 2019/0354194 | A1* | 11/2019 | Wang | G06V 10/82 |
| 2019/0377423 | A1* | 12/2019 | Marton | G06F 3/023 |
| 2021/0026455 | A1* | 1/2021 | Dash | G06V 20/20 |
| 2022/0084279 | A1* | 3/2022 | Lindmeier | G06T 19/20 |
| 2022/0101593 | A1* | 3/2022 | Rockel | G06F 3/04815 |

* cited by examiner

Fig.4

| # | HAND GESTURE | | COMMAND |
|---|---|---|---|
| | MOTION LOCUS | NAME | |
| 1 | LOCUS REPRESENTING MOTION INCLUDING MAKING INDEX FINGER AND THUMB CONTACT AND PART FROM EACH OTHER | CLICK HAND GESTURE | CLICK OPERATION |
| 2 | LOCUS REPRESENTING MOTION INCLUDING MAKING INDEX FINGER AND THUMB QUICKLY CONTACT AND PART FROM EACH OTHER TWICE | DOUBLE CLICK HAND GESTURE | DOUBLE CLICK OPERATION |
| 3 | LOCUS REPRESENTING MOTION INCLUDING KEEPING INDEX FINGER AND THUMB IN CONTACT WITH EACH OTHER AND UNMOVED, FOR PREDETERMINED TIME OR LONGER, AND THEN SEPARATING INDEX FINGER AND THUMB FROM EACH OTHER | HOLD-DOWN HAND GESTURE | HOLDING-DOWN OPERATION |
| 4 | LOCUS REPRESENTING MOTION INCLUDING MAKING INDEX FINGER AND THUMB CONTACT EACH OTHER AND MOVING HAND TO TARGET POSITION KEEPING INDEX FINGER AND THUMB IN CONTACT, AND SEPARATING INDEX FINGER AND THUMB FROM EACH OTHER AT TARGET POSITION | DRAG-AND-DROP HAND GESTURE | DRAG-AND-DROP OPERATION |
| 5 | LOCUS REPRESENTING MOTION INCLUDING MAKING INDEX FINGER AND THUMB CONTACT EACH OTHER, AND SLIDING EITHER FINGER IN SLIDE DIRECTION | SWIPE HAND GESTURE | SWIPING OPERATION |
| 6 | LOCUS REPRESENTING MOTION INCLUDING MAKING INDEX FINGER, THUMB, AND MIDDLE FINGER CONTACT EACH OTHER, AND SEPARATING ONLY INDEX FINGER | PINCH-OUT HAND GESTURE | PINCHING-OUT OPERATION |
| 7 | LOCUS REPRESENTING MOTION INCLUDING MAKING THUMB AND MIDDLE FINGER CONTACT EACH OTHER, AND BRINGING INDEX FINGER CLOSE TO OR INTO CONTACT WITH THUMB OR MIDDLE FINGER | PINCH-IN HAND GESTURE | PINCHING-IN OPERATION |
| 8 | LOCUS REPRESENTING MOTION INCLUDING MAKING THUMB AND MIDDLE FINGER CONTACT EACH OTHER, AND ROTATING WRIST TO RIGHT OR LEFT KEEPING INDEX FINGER SEPARATED FROM THUMB AND MIDDLE FINGER | ROTATE HAND GESTURE | ROTATING OPERATION |

TB1

ELECTRONIC DEVICE THAT OPERATES ACCORDING TO USER'S HAND GESTURE, AND IMAGE FORMING APPARATUS

INCORPORATION BY REFERENCE

This application claims priority to Japanese Patent Application No. 2020-199779 filed on Dec. 1, 2020, the entire contents of which are incorporated by reference herein.

BACKGROUND

The present disclosure relates to an electronic device and an image forming apparatus, and in particular to a technique to perform operations in accordance with a hand gesture of a user.

Recently, various methods for operating an electronic device, such as a TV set or a personal computer, with a user's gesture, have been proposed. Such methods enable the electronic device to be remotely operated, without the need to employing an input device such as a mouse, a keyboard, or a remote controller.

For example an electronic device is known that includes a camera that shoots a user's hand, a storage device containing in advance a plurality of predetermined hand shapes such as a fist, an open hand, and thumb-up, a hand shape recognition device that decides whether the hand shape shot by the camera accords with one of the hand shapes stored in the storage device, and a command execution controller that executes a command corresponding to the hand shape (e.g., move a focus, play back a medium, pause the playback), when it is decided that the hand shape that has been shot accords with one of the hand shapes in the storage device, and an absolute value of a moving distance of the hand shape that has been shot is larger than a threshold. With such a configuration, the electronic device executes the command corresponding to the user's hand gesture that has been shot.

SUMMARY

The disclosure proposes further improvement of the foregoing technique.

In an aspect, the disclosure provides an electronic device including a display device, a camera, a control device, and a storage device. The camera shoots a user's hand raised up in the air. The control device includes a processor, and acts as a finger position identifier, a display controller, a hand gesture recognizer, a command acquirer, and a controller, when the processor executes a control program. The finger position identifier identifies a specific finger, from a shot image of the user's hand raised up in the air, provided by the camera, and identifies a position of the specific finger in the shot image. The display controller causes the display device to display a cursor on a screen, at a position corresponding to the position of the specific finger identified by the finger position identifier. The storage device contains in advance a plurality of predetermined hand gestures including at least actions of the specific finger making contact with another finger, and commands respectively associated with the plurality of hand gestures. The hand gesture recognizer recognizes the hand gesture, from a plurality of shot images sequentially acquired from the camera. The command acquirer acquires the command associated with the hand gesture recognized by the hand gesture recognizer, from the storage device. The controller performs an operation according to the command acquired by the command acquirer, on the position of the cursor on the screen of the display device.

In another aspect, the disclosure provides an image forming apparatus including the foregoing electronic device, and an image forming device. The image forming device forms an image on a recording medium.

BRIEF DESCRIPTION OF THE DRAWINGS

FIG. 4 is an exemplary data table in which hand gestures and commands are respectively associated with each other;

DETAILED DESCRIPTION

Figure 1:
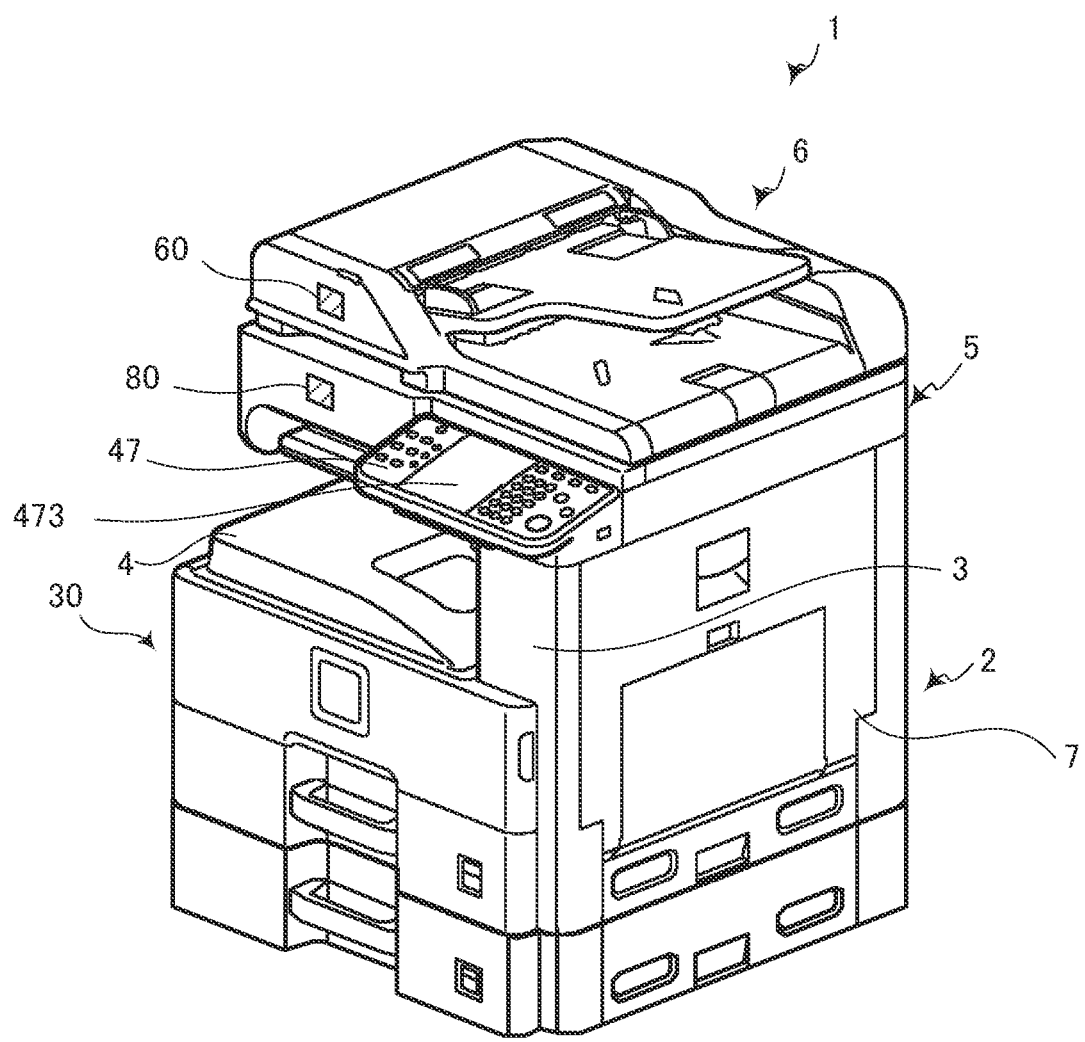
FIG. 1 a perspective view showing the appearance of an image forming apparatus according to an embodiment of the disclosure.

Hereafter, an electronic device, and an image forming apparatus incorporated with the electronic device, according to an embodiment of the disclosure, will be described with reference to the drawings. FIG. 1 is a perspective view showing the appearance of the image forming apparatus according to the embodiment of the disclosure.

The image forming apparatus 1 is a multifunction peripheral having a plurality of functions such as facsimile communication, copying, printing, and scanning. As shown in FIG. 1, the image forming apparatus 1 includes an apparatus main body 2, an image reading device 5 located on the upper side of the apparatus main body 2, and an intermediate body 3 provided between the image reading device 5 and the apparatus main body 2.

In a casing 7 constituting the outer shell of the image forming apparatus 1, a plurality of components for realizing various functions of the image forming apparatus 1 are accommodated. For example, the image reading device 5, an image forming device 12 (see FIG. 2), a fixing device, a paper feeding device 30, an operation device 47, and a camera 60 are provided in the casing 7.

The image reading device 5 is an automatic document feeder (ADF) including a document transport device 6, and a scanner that optically reads a source document transported by the document transport device 6 or placed on a non-illustrated contact glass. The image reading device 5 reads one by one the documents to be transmitted by facsimile, thereby acquiring image data to be formed into a visible image.

The image forming device 12 includes a photoconductor drum, a charging device, an exposure device, a developing device, and a transfer device, and forms (prints) an image on a recording sheet delivered from the paper feeding device 30, on the basis of the image read by the image reading device 5, or data for printing transmitted from a personal computer connected via a network. The recording sheet on which the image has been formed undergoes a fixing process by the fixing device, and is then delivered to an output tray 4.

Here, the electronic device is, for example, constituted of the components of the image forming apparatus 1, except the image reading device 5, the document transport device 6, and the image forming device 12.

The operation device 47 includes, for example, hard keys such as a start key for instructing the execution of a function that the image forming apparatus 1 is capable of performing, an enter key for establishing a setting inputted through an operation screen, and numeric keys for inputting numerals. The operation device 47 receives instructions from the user, with respect to operations and processings that the image forming apparatus 1 is capable of performing.

In addition, the operation device 47 includes a display device 473 for displaying, for example, an operation guide for the user. The display device 473 includes a display such as an LCD, and a touch panel overlaid on the front face of the display, so as to accept a touch operation of the user. Accordingly, the user can operate the image forming apparatus 1, by touching a button or key displayed on the screen of the display device 473.

The camera 60 is, for example, an infrared camera configured to shoot a hand raised up in the air by the user located in front of the image forming apparatus 1. The camera 60 may be a depth camera, incorporated with a depth sensor (or a range image sensor) for acquiring depth information. With the depth camera, a three-dimensional information can be acquired, by acquiring the depth information in addition to the two-dimensional image shot by an ordinary camera.

Further, the image forming apparatus 1 includes, on the front side thereof, a user detection sensor 80 for detecting a user located within a certain range forward of the image forming apparatus 1. The user detection sensor 80 is, for example, an optical sensor including a light emitter and a photodetector, and outputs, when the photodetector receives the light emitted from the light emitter and reflected by the user, a detection signal indicating the presence of the user in the certain range forward of the image forming apparatus 1, to a controller 100 to be subsequently described.

Figure 2:
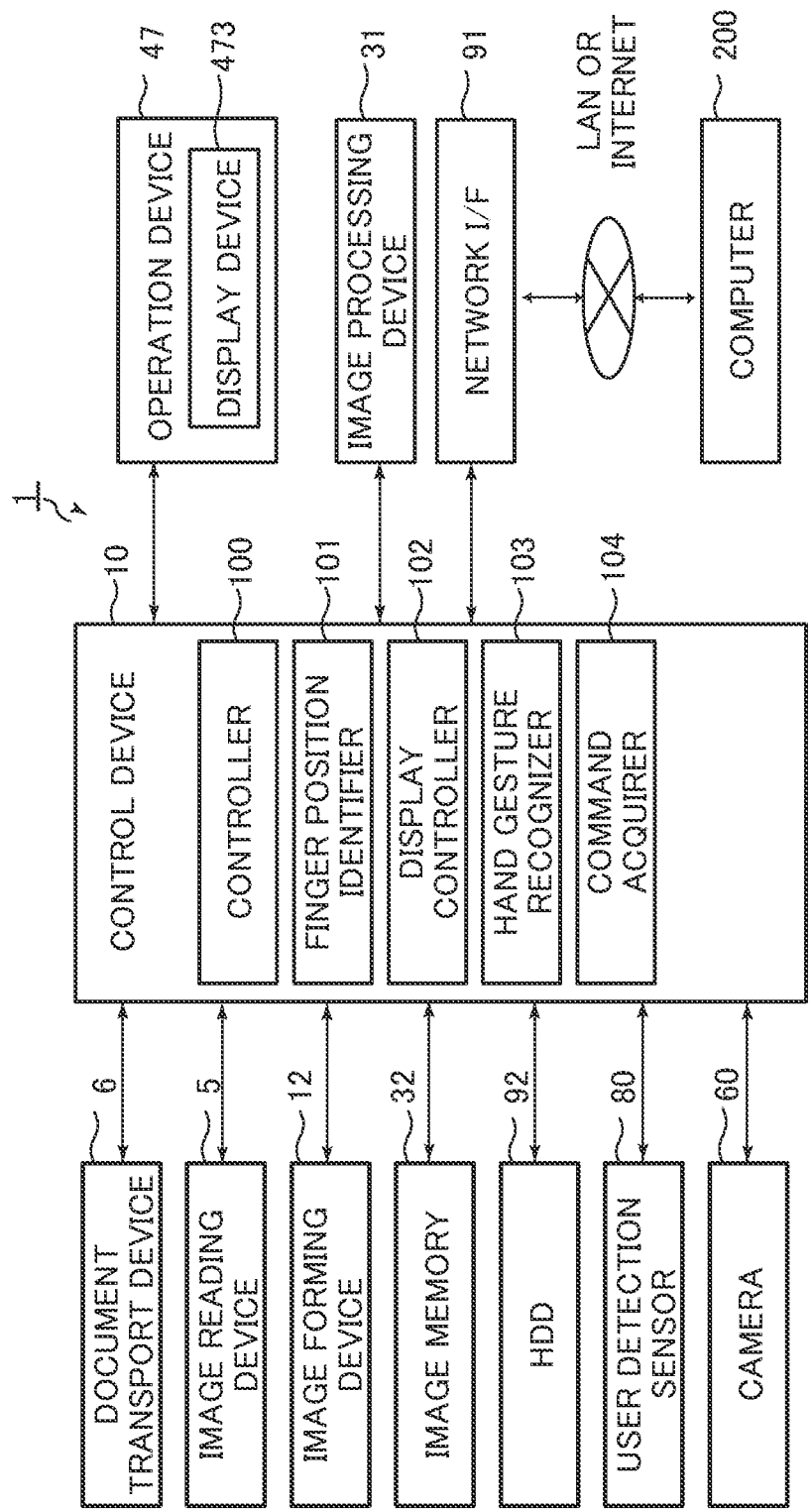
FIG. 2 is a functional block diagram showing an essential internal configuration of the image forming apparatus.

Hereunder, a configuration of the image forming apparatus 1 will be described. FIG. 2 is a functional block diagram showing an essential internal configuration of the image forming apparatus 1.

The image forming apparatus 1 includes a control device 10. The control device 10 includes a processor, a random-access memory (RAM), a read-only memory (ROM), and an exclusive hardware circuit. The processor is, for example, a central processing device (CPU), an application specific integrated circuit (ASIC), or a micro processing device (MPU).

The image reading device 5 includes a reading mechanism having a light source and a CCD sensor, configured to operate under the control of the control device 10. The image reading device 5 reads the image from the source document, by emitting light from the light source to the document, and receiving the reflected light with the CCD sensor.

An image processing device 31 processes, as necessary, the image data representing the image read by the image reading device 5. The image processing device 31 performs a predetermined image processing, for example shading correction, to improve the image quality, when the image read by the image reading device 5 is formed by the image forming device 12.

An image memory 32 is a region for temporarily storing the data of the source image read by the image reading device 5, and the data to be formed into the image by the image forming device 12.

The image forming device 12 forms images, on the basis of print data read by the image reading device 5, print data received from the computer 200 connected via the network, and so forth.

A network interface (network I/F) 91 includes a communication module such as a LAN board, and transmits and receives various types of data to and from, for example, the computer 200 in the local area, via the LAN connected to the network I/F 91. The image forming apparatus 1 is configured to accept connection of a plurality of computers 200.

A hard disk drive (HDD) 92 is a large-capacity storage device, for storing document images read by the image reading device 5, various programs and data, and a data table TB1 to be subsequently described.

The control device 10 acts as a controller 100, a finger position identifier 101, a display controller 102, a hand gesture recognizer 103, and a command acquirer 104, when the processor executes a control program stored in the HDD 92. Here, the controller 100 may be constituted in the form of a hardware circuit, instead of being realized by the operation of the control device 10 according to the control program.

The controller 100 is connected to the image reading device 5, the document transport device 6, the image processing device 31, the image memory 32, the image forming device 12, the operation device 47, the network I/F 91, the HDD 92, the camera 60, and the user detection sensor 80, and controls the operation the mentioned components.

Figure 3:
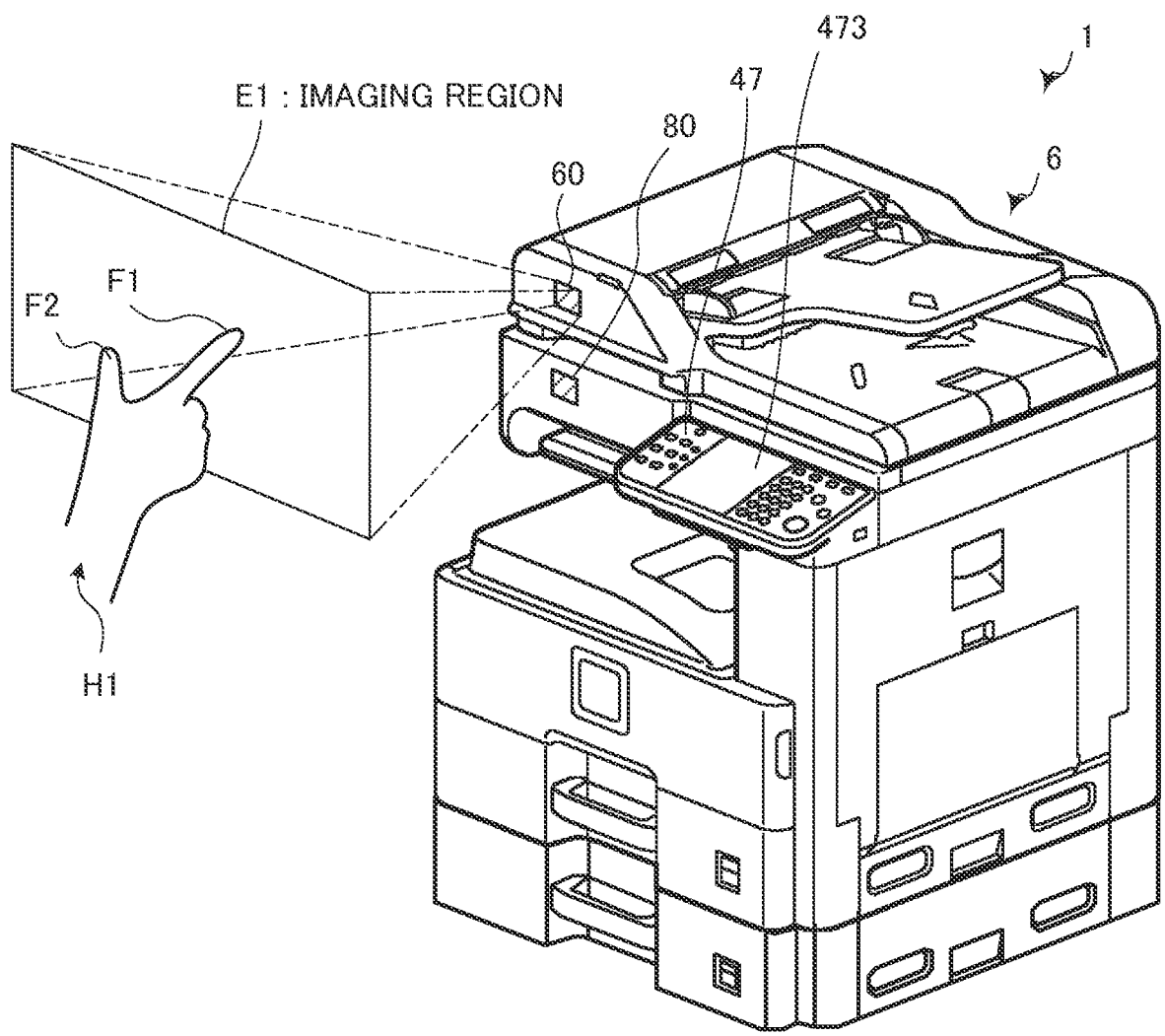
FIG. 3 is a schematic drawing showing how a camera shoots a user's hand raised up in the air.

FIG. 3 is a schematic drawing showing how the camera shoots the user's hand raised up in the air. As shown in FIG. 3, the camera 60 shoots the hand raised up into a predetermined imaging region E1 in the air, by the user located in front of the image forming apparatus 1. In this example, the imaging region E1 is defined, as shown in FIG. 3, at a desired position forward of the image forming apparatus 1 (e.g., the position opposite to the front side of the image forming apparatus 1 and the vicinity thereon, and at a height corresponding to the chest of ordinary grown-ups. The image of the imaging region E1 shot by the camera 60 corresponds to a shot image C1 shown in FIG. 6B to be subsequently referred to, and shot images C1 and C2 shown in FIG. 7B to be subsequently referred to.

The finger position identifier 101 identifies, from the shot image provided by the camera 60, a specific finger (e.g., index finger) of the hand raised up in the air by the user located in front of the image forming apparatus 1, and also identifies the position of the specific finger in the shot image.

To be more detailed, the finger position identifier 101 recognizes the image of the user's fingers, through image processing such as pattern matching based on binarizing or gradation information, with respect to the shot image from the camera 60. In this embodiment, the finger position identifier 101 decides whether the shot image represents an image of the user's hand, and whether the shot image represents the right hand or left hand, through pattern matching between the image of the user's hand extracted from the shot image and a reference image representing a hand of a grown-up person, stored in advance in the HDD 92. Here, an individual reference image representing the user's own hand may be shot in advance with the camera 60, and such individual reference image may be employed as the reference image, instead of the hand of an ordinary grown-up person. Upon deciding that the shot image from the camera 60 represents the right hand or the left hand of the user, the finger position identifier 101 further decides whether the shot image contains the image of the predetermined specific finger, for example the index finger, through image processing such as pattern matching, to thereby recognize the specific finger of the right hand or the left hand, and identify the position coordinate of the specific finger in the shot image. Further, the finger position identifier 101 recognizes other fingers than the specific finger (at least the thumb and middle finger), in the same way as recognizing the specific finger, and identifies the position coordinate of such other fingers in the shot image.

Here, the camera 60 and the finger position identifier 101 may be constituted of a known gesture sensor. The known gesture sensor can shoot the shape and the motion of the hand with an infrared camera, process the shot image with an image processing module, and acquire the position coordinate of each finger in the three-dimensional coordinate. In this case, the infrared camera of the known gesture sensor corresponds to the camera 60, and the image processing module corresponds to the finger position identifier 101. Further, when the depth camera is employed instead of the infrared camera, the hand gesture can be more accurately identified, by utilizing the depth information.

The display controller 102 causes the display device 473 to display a cursor on the screen, at the position corresponding to the position of the specific finger (e.g., index finger) identified by the finger position identifier 101. The display controller 102 possesses, for example, a known projection calculation formula for projecting the coordinate position in the rectangular shot image C1, to the rectangular screen of the display device 473, to calculate, with the known projection calculation formula, the corresponding position in the screen of the display device 473 corresponding to the coordinate position of the index finger in the shot image C1 identified by the finger position identifier 101, and displays the cursor at the corresponding position calculated as above.

The HDD 92 contains, in advance, a plurality of predetermined hand gestures at least including the actions of the specific finger (e.g., index finger) making contact with another finger, and commands respectively associated with the plurality of hand gestures.

To be more detailed, the HDD 92 contains a data table TB1 shown in FIG. 4, in which the hand gestures and the commands are associated with each other. FIG. 4 illustrates an example of the data table in which the hand gestures and the commands are associated with each other. The data table TB1 includes, for example, eight types of hand gestures and eight commands, associated with each other on a one-to-one basis.

A click hand gesture refers to such a motion locus of the user's fingers that the index finger and the thumb are made to contact and part from each other, and a command to perform a click operation is associated with the click hand gesture. A double-click hand gesture refers to such a motion locus of the user's fingers that the index finger and the thumb are made to quickly contact and part from each other twice, and a command to perform a double-click operation is associated with the double-click hand gesture.

A hold-down hand gesture refers to such a motion locus of the user's fingers that the index finger and the thumb are made to contact each other and kept unmoved for a predetermined time or longer, and then separated from each other, and a command to perform a hold-down operation is associated with the hold-down hand gesture.

A drag-and-drop hand gesture refers to such a motion locus of the user's fingers that the index finger and the thumb are made to contact each other and moved to a desired target position kept in contact, after which the index finger and the thumb are separated, and a command to perform a drag-and-drop operation is associated with the drag-and-drop hand gesture. The drag-and-drop hand gesture consists of a drag gesture including making the index finger and the thumb contact each other and moving them to a desired position keeping in contact with each other, and a drop gesture including separating the index finger and the thumb from each other at the target position.

A swipe hand gesture refers to such a motion locus of the user's fingers that the index finger and the thumb are made to contact each other, and one of the fingers is made to slide in a slide direction, and a command to perform a swipe operation is associated with the swipe hand gesture.

A pinch-out hand gesture refers to such a motion locus of the user's fingers that the index finger, the thumb, and the middle finger are made to contact each other, and then only the index finger is separated, and a command to perform a pinch-out operation is associated with the pinch-out hand gesture. A pinch-in hand gesture refers to such a motion locus of the user's fingers that the thumb and the middle finger are made to contact each other, and then the index finger comes close to or makes contact with the thumb or middle finger, and a command to perform a pinch-out operation is associated with the pinch-out hand gesture.

A rotate hand gesture refers to such a motion locus of the user's fingers that the thumb and the middle finger are made to contact each other, with the index finger kept away from the thumb and the middle finger, and the wrist is rotated to the right or left, and a command to perform a rotate operation is associated with the rotate hand gesture.

The hand gesture recognizer 103 recognizes the gesture of the user located in front of the image forming apparatus 1, from a plurality of shot images sequentially acquired from the camera 60. To be more detailed, the hand gesture recognizer 103 recognizes the gesture performed by the user, by recognizing the image of the user's hand contained in the shot image from the camera 60, detecting the motion locus of the hand, the specific finger, and other fingers in the shot image from the camera 60, and deciding whether the detected motion locus matches any of the loci respectively representing the plurality of predetermined gestures stored in the HDD 92.

The command acquirer 104 acquires the command associated with the hand gesture recognized by the hand gesture recognizer 103, from the HDD 92. For example, when the hand gesture recognized by the hand gesture recognizer 103 is the click hand gesture, the command acquirer 104 looks up the data table TB1 in the HDD 92, to thereby acquire the command indicating the click operation, as the command associated with the click hand gesture.

The controller 100 performs the operation corresponding to the command acquired by the command acquirer 104, on the cursor position on the screen of the display device 473.

Figure 5:
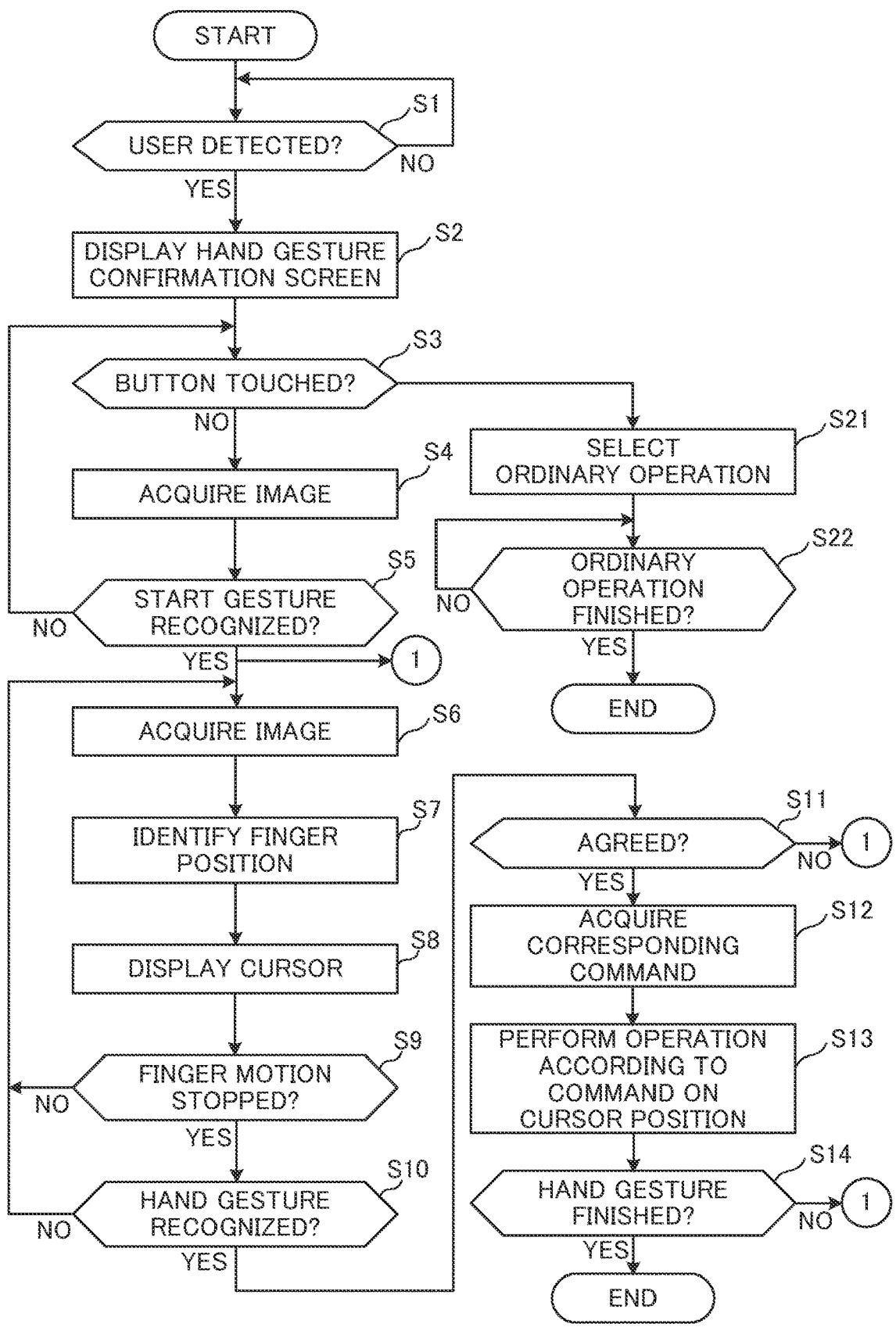
FIG. 5 is a flowchart showing a hand gesture processing operation performed by the image forming apparatus.

Hereunder, a hand gesture processing operation, performed by the image forming apparatus 1 according to the embodiment of the disclosure, will be described. FIG. 5 is a flowchart showing the hand gesture processing operation performed by the image forming apparatus 1.

First, the controller 100 detects whether the user is present in a certain range forward of the image forming apparatus 1 (S1). For example, upon receipt of a detection signal from the user detection sensor 80 (YES at S1), the controller 100 decides that the user is present. In contrast, in the case where the detection signal is not received from the user detection sensor 80 (NO at S1), the controller 100 decides that the user is not present, and stands by for the receipt of the detection signal.

Figure 6A:
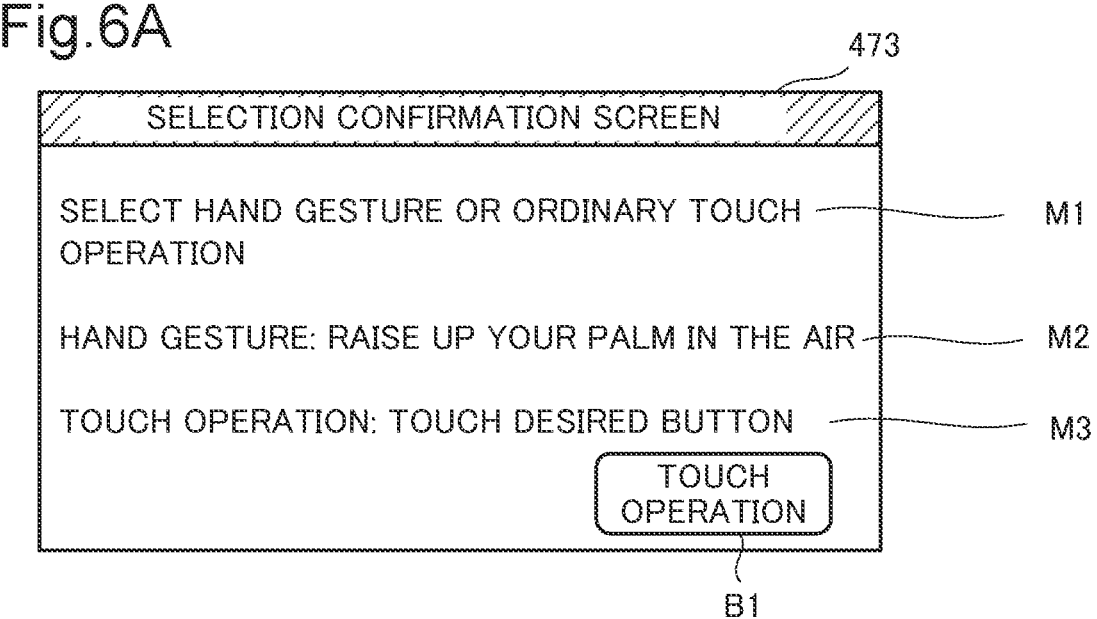
FIG. 6A is a schematic drawing showing an example of a selection confirmation screen displayed on a display device of the image forming apparatus.

Upon detecting that the user is present in front of the image forming apparatus 1 (YES at S1), the controller 100 causes the display device 473 to display a selection confirmation screen about the hand gesture, as shown in FIG. 6A (S2). FIG. 6A illustrates an example of the selection confirmation screen, displayed on the display device 473 of the image forming apparatus 1. The selection confirmation screen shown in FIG. 6A includes, for example, a message M1 like "Select Hand Gesture or Ordinary Touch Operation", a message M2 like "Hand Gesture: Raise up Your Palm in the Air" and a message M3 like "Touch Operation: Touch Desired Button". The message M2 is for urging the user to perform calibration, before starting the operation through the hand gesture.

The controller 100 decides whether the user has touched a touch button B1 displayed on the screen of the display device 473 shown in FIG. 6A (S3). When the touch operation on the touch button B1 is detected through the touch panel function of the display device 473 (YES at S3), the controller 100 selects the ordinary operation (S21). In other words, the controller 100 accepts the pressing operation on the hard keys of the operation device 47 and the touch operation on the screen of the display device 473, but does not respond to a hand gesture. The controller 100 then finishes the operation, when the touch operation on a non-illustrated end button, for instructing to finish the ordinary operation, is detected through the touch panel function of the display device 473, or when the user moves away from the image forming apparatus 1 and becomes undetected by the user detection sensor 80 (YES at S22). In the case where the touch operation on the non-illustrated end button is not detected, and the user continues to be detected by the user detection sensor 80 (NO at S22), the controller 100 accepts the instruction to perform the ordinary operation, whenever the user performs the ordinary operation, and returns to S22.

In the case where the stand-by time has elapsed, without the touch operation on the touch button B1 having been detected at S3 (NO at S3), the controller 100 displays the message M2, and also a countdown display for notifying the shooting timing of the camera 60, on the display device 473, and acquires the shot image taken by the camera 60 at the shooting timing (S4). It will be assumed here that the user located in front of the image forming apparatus 1 is raising the right hand of an open state in the air, and that the camera 60 has shot the user's right hand.

Figure 6B:
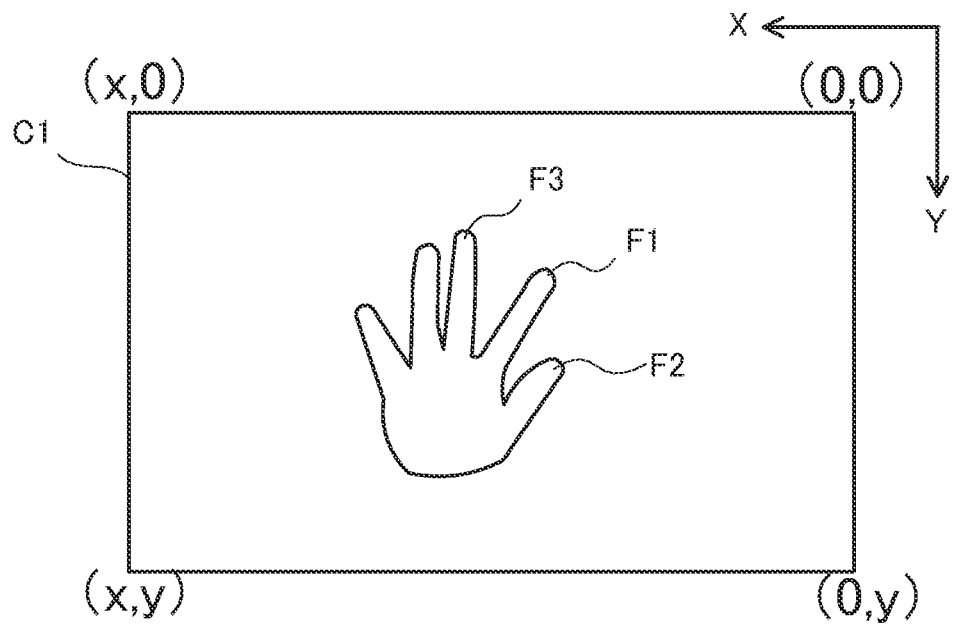
FIG. 6B is a schematic drawing showing an example of a shot image of a right hand raised up by the user, for calibration before starting an operation through the hand gesture.

FIG. 6B illustrates an example of the shot image of the right hand raised up by the user, for calibration before starting the operation through the hand gesture. The shot image C1 shown in FIG. 6B has been taken by the camera 60, and includes the palm of the user's right hand. The coordinates of the shot image C1 shown in FIG. 6B can be defined such that the upper right corner is located at the coordinate (0, 0), the upper left corner is located at the coordinate (x, 0), the lower right corner is located at the coordinate (0, y), and the lower left corner is located at the coordinate (x, y). The finger position identifier 101 identifies the index finger F1, the thumb F2, and the middle finger F3 of the user's right hand raised up in the air, on the basis of the shot image C1, and also identifies the respective positions of the index finger F1, the thumb F2, and the middle finger F3, in the shot image C1.

The hand gesture recognizer 103 decides whether a start gesture of showing the palm is included in the shot image C1 from the camera 60 (S5). In this case, the hand gesture recognizer 103 recognizes that the palm of the right hand of the user in front of the image forming apparatus 1 is open, according to the shot image C1 from the camera 60, thus recognizing that the start gesture has been shown (YES at S5). The display controller 102 causes the display device 473 to display a home screen shown in FIG. 8B, which will be subsequently described. The home screen home screen shown in FIG. 8B includes soft keys such as a key for selecting the copying function, a key 62 for selecting the transmission function, a key 63 for selecting the facsimile function, a key 64 for selecting the scanning function, a key 65 for selecting a job box, and a key 66 for selecting an external memory. The finger position identifier 101 identifies the index finger of the user's right hand raised up in the air, and also the coordinate position of the index finger in the shot image C1. The display controller 102 calculates the position on the screen of the display device 473 corresponding to the coordinate position of the index finger in the shot image C1, and displays the cursor CR at the calculated corresponding position.

In the case where the hand gesture recognizer 103 decides at S5 that the start gesture has not been shown (NO at S5), the controller 100 returns to S3.

Figure 7A:
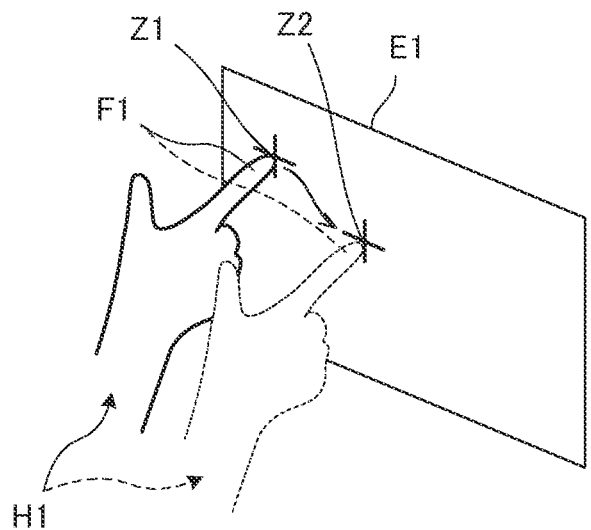
FIG. 7A is a schematic drawing showing the user's right hand being moved in the air.
Figure 7B:
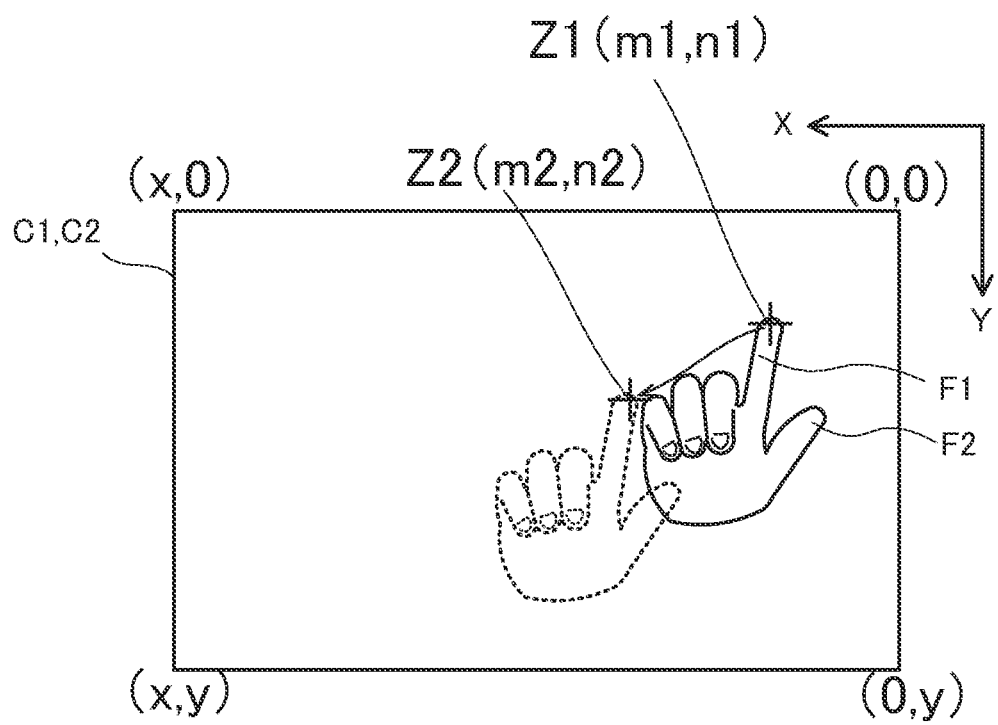
FIG. 7B is a schematic drawing showing a shot image corresponding to FIG. 7A.
Figure 8A:
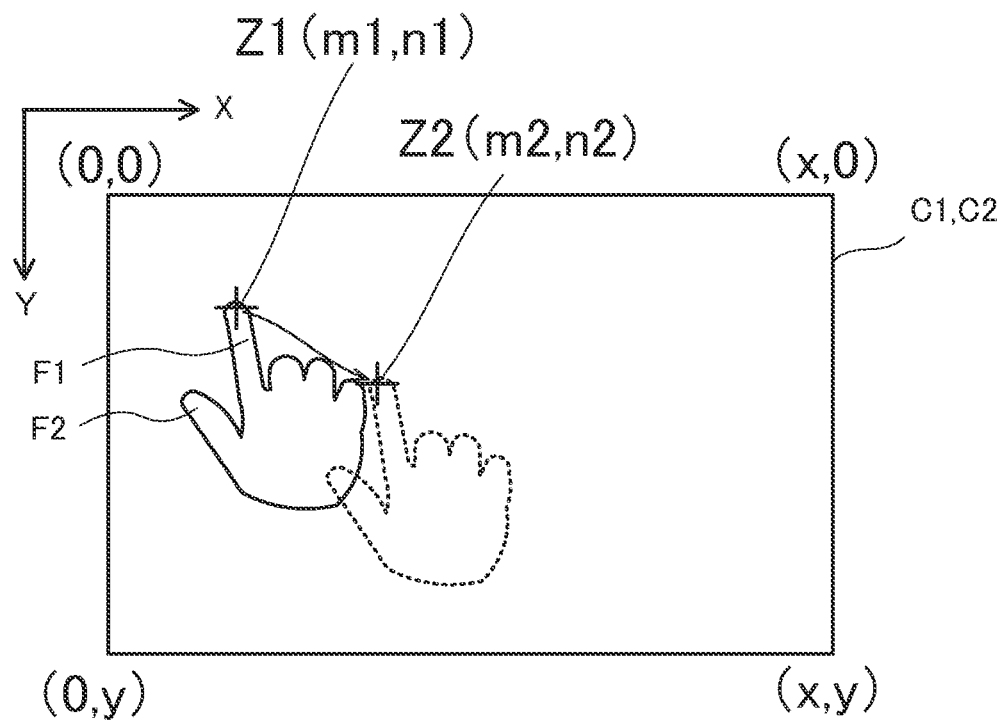
FIG. 8A is a schematic drawing showing the shot image of FIG. 7B, horizontally inverted.

Then the controller 100 acquires the shot image from the camera 60 (S6). The finger position identifier 101 identifies the index finger of the user's hand raised up in the air, and also the position of the index finger in the shot image (S7). FIG. 7A illustrates how the user moves the right hand in the air. FIG. 7B illustrates the shot image corresponding to the motion shown in FIG. 7A. In this case, the index finger F1 of the right hand H1 raised up in the air has moved from a position Z1 to a position Z2, in an imaging region E1, as shown in FIG. 7A. The shot image C1 shown in FIG. 7B represents the index finger F1 of the right hand H1, indicated by solid lines, located at the position Z1 (m1, n1). The shot image C2 shown in FIG. 7B represents the index finger F1 of the right hand H1, indicated by dotted lines, located at the position Z2 (m2, n2). The finger position identifier 101 identifies, from the shot images C1 and C2 shown in FIG. 7B, that the index finger F1 has moved from the position Z1 (m1, n1) in the shot image C1, to the position Z2 (m2, n2) in the shot image C2. FIG. 8A illustrates the shot images of FIG. 7B, horizontally inverted. In other words, the shot images C1 and C2 shown in FIG. 8A represent the images viewed from the side of the user.

Figure 8B:
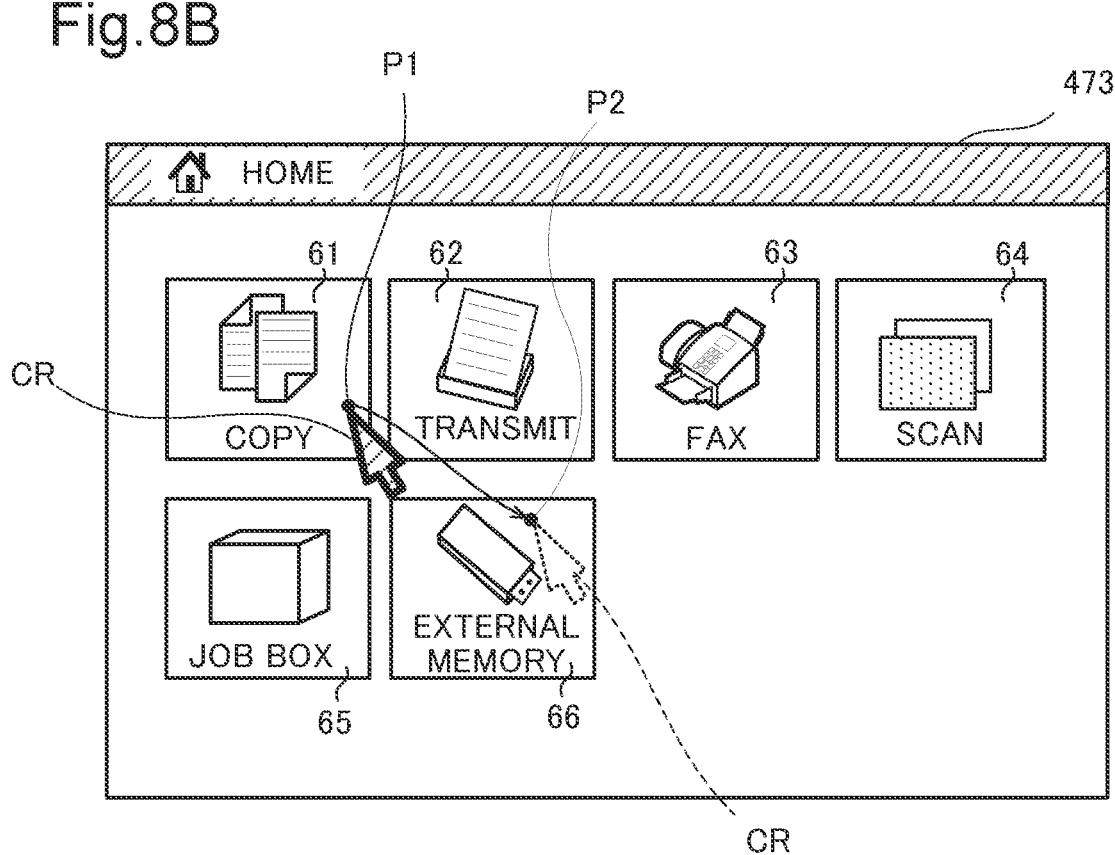
FIG. 8B is a schematic drawing showing a screen in which a cursor moves so as to follow up the motion of the index finger shown in FIG. 8A.

The display controller 102 causes the display device 473 to display the cursor on the screen, at the position corresponding to the position of the index finger identified by the finger position identifier 101 (S8). FIG. 8B illustrates the screen in which the cursor moves so as to follow up the motion of the index finger shown in FIG. 8A. As shown in FIG. 8B, the display controller 102 causes the display device 473 to display the cursor CR on the screen (in this case, home screen) at a position P1 corresponding to the position Z1 of the index finger identified by the finger position identifier 101, to move the cursor CR so as to follow up the motion of the index finger F1, and then to display the cursor CR on the screen (home screen) at a position P2 corresponding to the position Z2 of the index finger identified by the finger position identifier 101.

The controller 100 decides whether the index finger has stopped moving (S9). For example, the controller 100 compares between the position of the index finger identified by the finger position identifier 101 in the latest shot image, and position of the index finger identified by the finger position identifier 101 in the immediately preceding shot image or a predetermined number of preceding shot images, and decides that the index finger has stopped moving when the moving distance is equal to or shorter than a predetermined threshold. Alternatively, the controller 100 may decide that the index finger has stopped moving, when the acceleration of the index finger is equal to or lower than a predetermined threshold.

Upon deciding that the index finger has not stopped moving (NO at S9), the controller 100 returns to S6. In contrast, when the controller 100 decides that the index finger has stopped moving (YES at S9), the hand gesture recognizer 103 recognizes the gesture of the user located in front of the image forming apparatus 1, from the plurality of shot images sequentially acquired from the camera 60 (S10). It is assumed here that, as shown in FIG. 8A, the index finger F1 has stopped at the position Z2 (m2, n2) in the shot image C2. In other words, it is assumed that, as shown in FIG. 8B, the cursor CR has stopped at the corresponding position P2 on the screen of the display device 473, corresponding to the position of the key 66. Here, the controller 100 stores information indicating the corresponding position P2 in the home screen where the cursor CR has stopped, in the RAM (or HDD 92). Instead, the controller 100 may store information indicating the position Z2 (m2, n2) in the shot image C2 where the index finger F1 has stopped, in the RAM (or HDD 92).

When the index finger F1 (specific finger) and the thumb F2 (another finger) are made to contact each other within a predetermined time (e.g., one second) after the index finger F1 stopped, the hand gesture recognizer 103 recognizes that a hand gesture has been performed (YES at S10), and the operation proceeds to S11. In contrast, when the index finger F1 (specific finger) and the thumb F2 (another finger) are made to contact each other after the predetermined time (e.g., one second) has elapsed after the index finger F1 stopped, the hand gesture recognizer 103 does not recognize that a hand gesture has been performed (NO at S10), and the operation returns to S6.

Here, the hand gesture recognizer 103 may recognize that a hand gesture has been performed, when the moving speed or moving acceleration until the index finger F1 (specific finger) and the thumb F2 (another finger) are made to contact each other, after the index finger F1 stopped, is higher than a predetermined threshold.

Figure 9A:
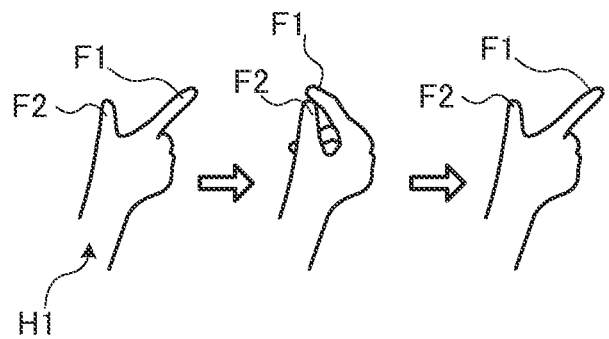
FIG. 9A is a schematic drawing showing a click hand gesture.

It is assumed here that the click hand gesture has been performed as shown in FIG. 9A. The click hand gesture shown in FIG. 9A includes making the index finger and the thumb contact and part from each other.

Upon deciding that a hand gesture has been performed (YES at S10), the hand gesture recognizer 103 decides whether the motion locus of the index finger F1 (specific finger) and the thumb F2 (another finger) of the user's right hand, being made to quickly contact and part from each other, detected from the plurality of shot images provided by the camera 60, matches any of the loci representing the plurality of predetermined gestures stored in the HDD 92 (S11).

In this example, the hand gesture recognizer 103 decides that the motion locus of the index finger F1 and the thumb F2, being made to quickly contact and part from each other, matches the locus representing the click hand gesture stored in the HDD 92 (YES at S11). Thus, the hand gesture recognizer 103 recognizes that the gesture performed by the user is the click hand gesture.

When the hand gesture recognizer 103 decides that the detected motion locus matches none of the loci representing the plurality of predetermined gestures stored in the HDD 92 (NO at S11), the operation returns to S6.

The command acquirer 104 acquires the command associated with the hand gesture recognized by the hand gesture recognizer 103, from the HDD 92 (S12). Since the hand gesture recognized by the hand gesture recognizer 103 is the click hand gesture, the command acquirer 104 acquires the command indicating the click operation, as the command associated with the click hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the click operation), on the position of the cursor CR on the screen of the display device 473 (S13). Thus, the controller 100 performs the click operation, on the key 66 shown in FIG. 8B.

Figure 9B:
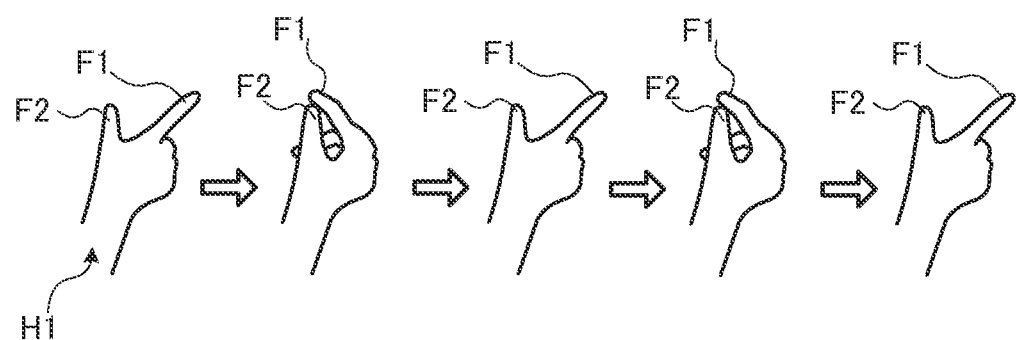
FIG. 9B is a schematic drawing showing a double-click hand gesture.

Hereunder, the case where the double-click hand gesture shown in FIG. 9B is performed at S10 will be described. The double-click hand gesture shown in FIG. 9B refers to the gesture of making the index finger and the thumb quickly contact and part from each other twice.

Upon recognizing that a hand gesture has been performed (YES at S10), the hand gesture recognizer 103 decides whether the motion locus of the index finger F1 (specific finger) and the thumb F2 (another finger) of the user's right hand, being made to quickly contact and part from each other twice, detected from the plurality of shot images provided by the camera 60, matches any of the loci representing the plurality of predetermined gestures stored in the HDD 92 (S11).

In this case, the hand gesture recognizer 103 decides that the motion locus of the index finger F1 and the thumb F2, being made to quickly contact and part from each other twice, matches the locus representing the double-click hand gesture stored in the HDD 92 (YES at S11). Thus, the hand gesture recognizer 103 recognizes that the gesture performed by the user is the double-click hand gesture.

The command acquirer 104 acquires the command associated with the hand gesture recognized by the hand gesture recognizer 103, from the HDD 92 (S12). Since the hand gesture recognized by the hand gesture recognizer 103 is the double-click hand gesture, the command acquirer 104 acquires the command indicating the double-click operation, as the command associated with the double-click hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the double-click operation), on the position of the cursor CR on the screen of the display device 473 (S13). Thus, the controller 100 performs the double-click operation, on the key 66 shown in FIG. 8B.

Figure 9C:
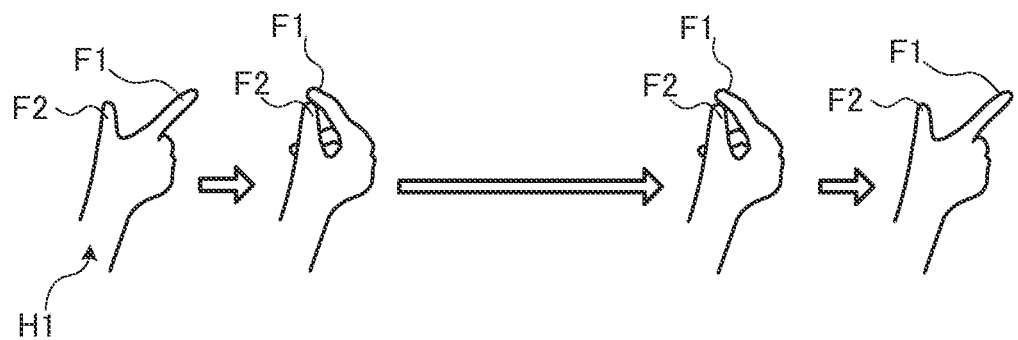
FIG. 9C is a schematic drawing showing a hold-down hand gesture.

Hereunder, the case where the hold-down hand gesture shown in FIG. 9C is performed at S10 will be described. The hold-down hand gesture shown in FIG. 9C refers to the gesture of making the index finger and the thumb contact each other and keeping them unmoved for a predetermined time (e.g., two seconds) or longer, and then separating those fingers from each other.

Upon recognizing that a hand gesture has been performed (YES at S10), the hand gesture recognizer 103 decides whether the motion locus of the index finger F1 (specific finger) and the thumb F2 (another finger) of the user's right hand, being made to contact each other and kept unmoved for the predetermined time (e.g., two seconds) or longer, and then separated from each other, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the hold-down hand gesture stored in the HDD 92 (YES at S11). Thus, the hand gesture recognizer 103 recognizes that the gesture performed by the user is the hold-down hand gesture.

The command acquirer 104 acquires the command associated with the hand gesture recognized by the hand gesture recognizer 103, from the HDD 92 (S12). Since the hand gesture recognized by the hand gesture recognizer 103 is the hold-down hand gesture, the command acquirer 104 acquires the command indicating the hold-down operation, as the command associated with the hold-down hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the hold-down operation), on the position of the cursor CR on the screen of the display device 473 (S13). Thus, the controller 100 performs the hold-down operation, on the key 66 shown in FIG. 8B.

Figure 10A:
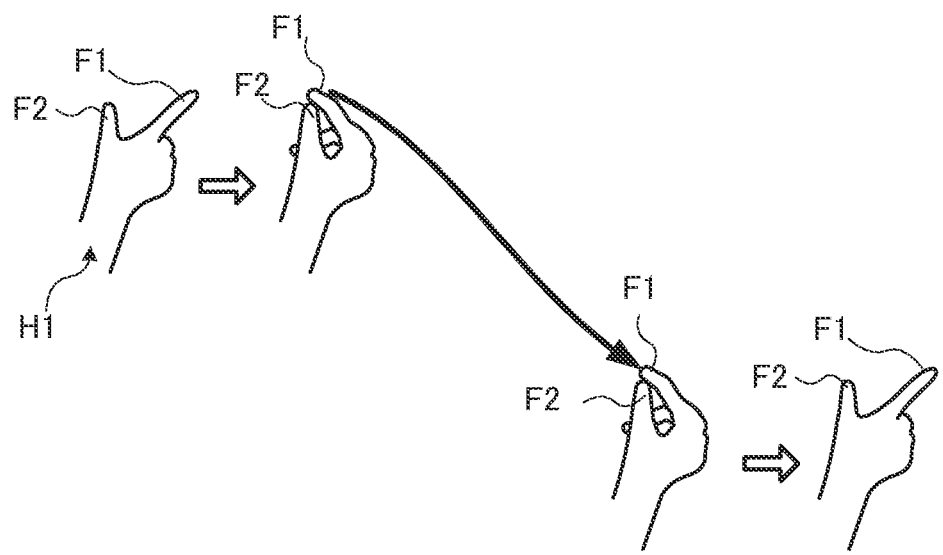
FIG. 10A is a schematic drawing showing drag-and-drop hand gesture.
Figure 10B:
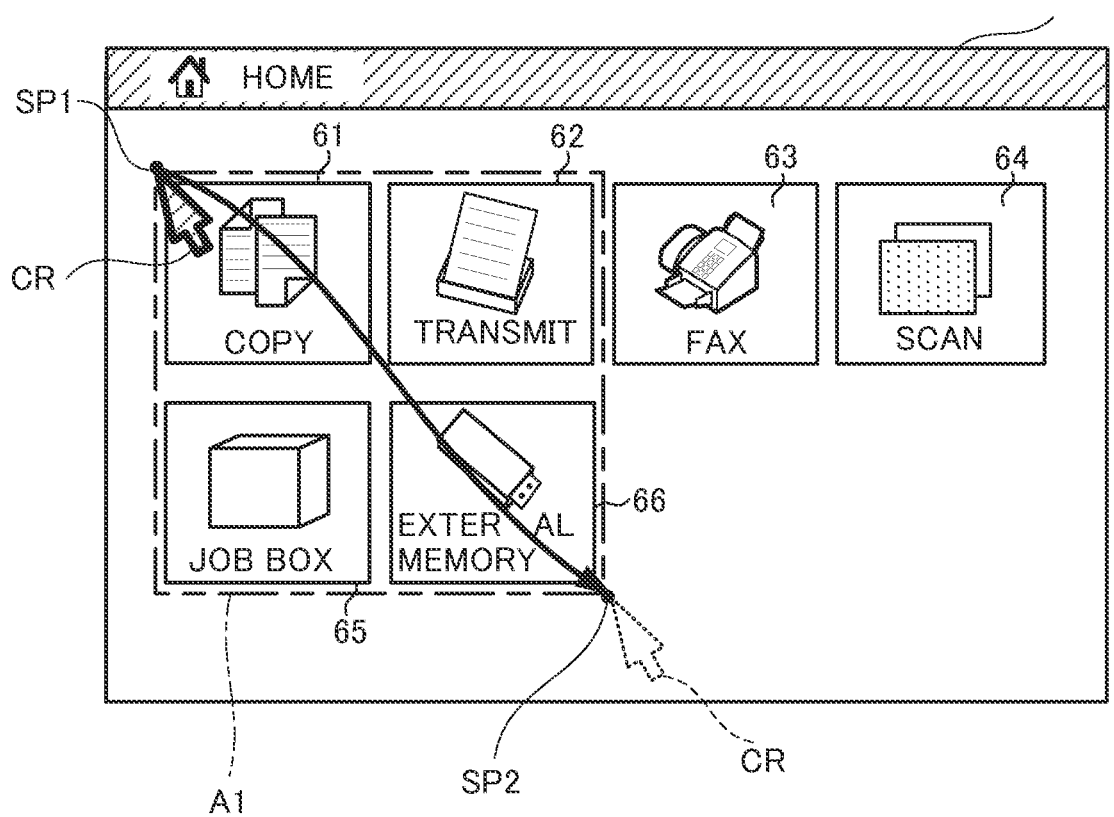
FIG. 10B is a schematic drawing showing a screen in which the cursor moves so as to follow up the drag-and-drop gesture shown in FIG. 10A.

Hereunder, the case where the drag-and-drop hand gesture shown in FIG. 10A is performed at S10 will be described. FIG. 10A illustrates the drag-and-drop hand gesture. FIG. 10B illustrates the screen in which the cursor moves so as to follow up the drag-and-drop gesture shown in FIG. 10A. The drag-and-drop hand gesture shown in FIG. 10A refers to the gesture of making the index finger and the thumb contact each other, moving them to a target position keeping the contact, and then separating the index finger and the thumb from each other.

Upon recognizing that a hand gesture has been performed (YES at S10), the hand gesture recognizer 103 decides whether the motion locus of the index finger F1 (specific finger) and the thumb F2 (another finger) of the user's right hand, being made to contact each other and moved to the target position kept in contact, and then separated from each other, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the drag-and-drop hand gesture stored in the HDD 92 (YES at S11). Thus, the hand gesture recognizer 103 recognizes that the gesture performed by the user is the drag-and-drop hand gesture.

The command acquirer 104 acquires the command associated with the hand gesture recognized by the hand gesture recognizer 103, from the HDD 92 (S12). Since the hand gesture recognized by the hand gesture recognizer 103 is the drag-and-drop hand gesture, the command acquirer 104 acquires the command indicating the hold-down operation, as the command associated with the drag-and-drop hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 defines the position of the cursor CR on the screen of the display device 473 as a starting corner SP1, where the index finger F1 and the thumb F2 were made to contact each other, defines the target position where the index finger F1 and the thumb F2 were stopped after being moved in contact with each other, as an ending corner SP2 located at the other end of a diagonal line drawn from the starting corner SP1, and performs the drag operation so as to select a rectangular range A1 defined by the starting corner SP1 and the ending corner SP2 (S13). Thus, the controller 100 performs the drag operation including selecting the rectangular range A1 shown in FIG. 10B.

After S13, the controller 100 decides whether the hand gesture has finished (S14). Since the user's right hand H1 is not in the thumb-up shape at this point (NO at S14), the operation proceeds to S11, through S6 to S10.

It is assumed here that, at S11, the hand gesture recognizer 103 has decided that the motion locus of the index finger F1 and the thumb F2 of the user's right hand, being separated from each other at the ending corner SP2, matches the locus representing the drop gesture of the drag-and-drop hand gesture stored in the HDD 92 (YES at S11). Accordingly, the hand gesture recognizer 103 recognizes that the gesture performed by the user is the drop gesture of the drag-and-drop hand gesture.

The command acquirer 104 acquires the command associated with the hand gesture recognized by the hand gesture recognizer 103, from the HDD 92 (S12). Since the hand gesture recognized by the hand gesture recognizer 103 is the drop gesture of the drag-and-drop hand gesture, the command acquirer 104 acquires the command indicating the drop operation, as the command associated with the drag-and-drop hand gesture, according to the data table TB1 shown in FIG. 4.

The controller 100 performs the drop operation, including defining the rectangular range A1 shown in FIG. 10B. To be more detailed, the controller 100 performs the drag-and-drop operation, including the drag operation for forming the rectangular range A1 defined by the starting corner SP1 and the ending corner SP2 as shown in FIG. 10B, and the drop operation including designating the rectangular range A1.

Figure 11A:
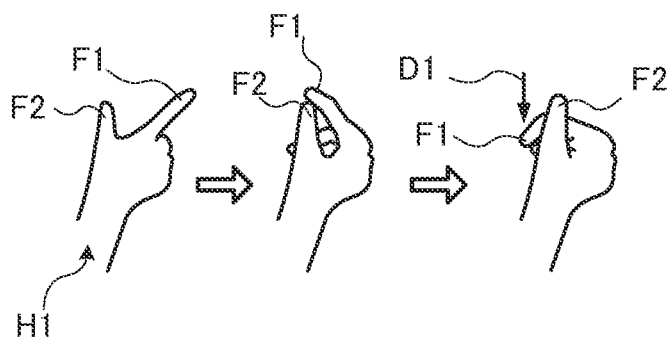
FIG. 11A is a schematic drawing showing a swipe hand gesture.

Hereunder, the case where the swipe hand gesture shown in FIG. 11A is performed at S10 will be described. FIG. 11A illustrates the swipe hand gesture. The swipe hand gesture shown in FIG. 11A refers to the gesture of making the index finger and the thumb contact each other, and sliding one of the fingers (in this example, the index finger) in a slide direction D1.

Upon recognizing that a hand gesture has been performed (YES at S10), the hand gesture recognizer 103 decides whether the motion locus of the index finger F1 (specific finger) and the thumb F2 (another finger) of the user's right hand, being made to contact each other, and the index finger F1 being made to slide in the slide direction D1, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the swipe hand gesture stored in the HDD 92 (YES at S11). Thus, the hand gesture recognizer 103 recognizes that the gesture performed by the user is the swipe hand gesture.

Figure 11B:
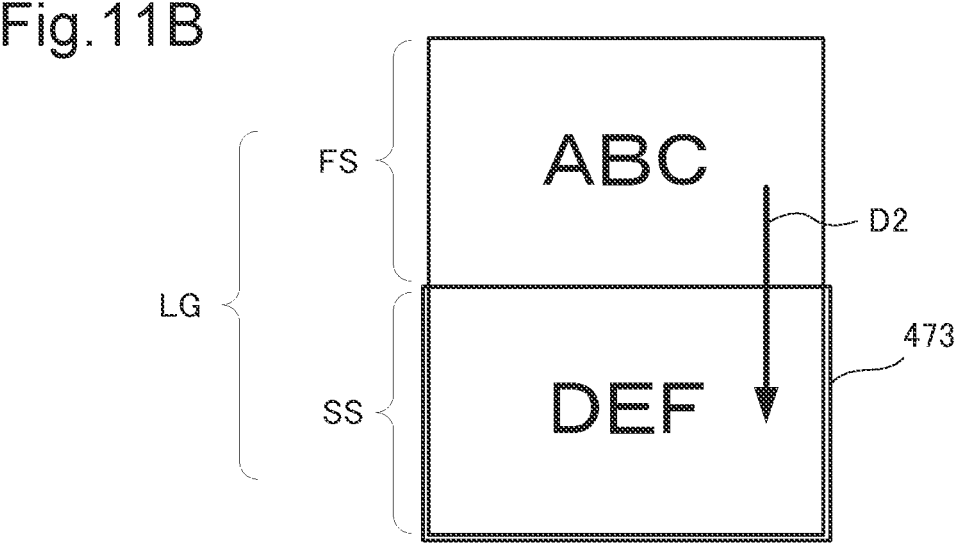
FIG. 11B is a schematic drawing showing an image for second screen displayed on the display device, out of an elongate image including an image for first screen and the image for second screen aligned in a swipe direction, to be individually displayed on the display device.

FIG. 11B illustrates an image for second screen displayed on the display device, out of an elongate image including an image for first screen and the image for second screen aligned in a swipe direction, to be individually displayed on the display device. As shown in FIG. 11B, the elongate image LG includes the image for first screen FS and the image for second screen SS aligned in the vertical direction (swipe direction). On the display device 473, the image for second screen SS is displayed, out of the elongate image LG.

The command acquirer 104 acquires the command associated with the hand gesture recognized by the hand gesture recognizer 103, from the HDD 92 (S12). Since the hand gesture recognized by the hand gesture recognizer 103 is the swipe hand gesture, the command acquirer 104 acquires the command indicating the swipe operation, as the command associated with the swipe hand gesture, according to the data table TB1 shown in FIG. 4.

Figure 11C:
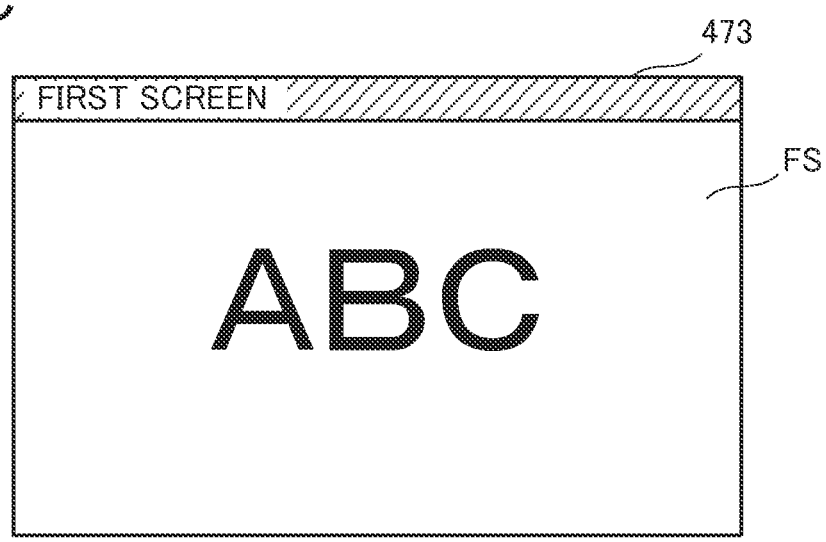
FIG. 11C is a schematic drawing showing the first screen displayed on the display device, as result of a swipe hand gesture performed on the screen of FIG. 11B.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the swipe operation), on the position of the cursor CR on the screen of the display device 473 (S13). Thus, the controller 100 performs the swipe operation, on the screen shown in FIG. 11C. FIG. 11C illustrates the first screen displayed on the display device, as result of the swipe hand gesture. In the screen of the display device 473, the image for second screen SS shown in FIG. 11B is moved in a swipe direction D2, corresponding to the slide direction D1, so that the image for first screen FS is displayed as shown in FIG. 11C.

Figure 12A:
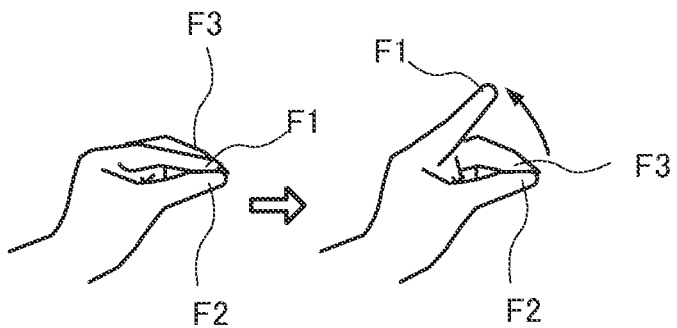
FIG. 12A is a schematic drawing showing a pinch-out hand gesture.

Hereunder, the case where the pinch-out hand gesture shown in FIG. 12A is performed at S10 will be described. FIG. 12A illustrates the pinch-out hand gesture. The pinch-out hand gesture shown in FIG. 12A refers to the gesture of making the index finger F1, the thumb F2, and the middle finger F3 contact each other, and separating only the index finger F1.

Upon recognizing that a hand gesture has been performed (YES at S10), the hand gesture recognizer 103 decides whether the motion locus of the index finger F1, the thumb F2, and the middle finger F3 of the user's right hand, being made to contact each other, and the index finger F1 alone being separated, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the pinch-out hand gesture stored in the HDD 92 (YES at S11). Thus, the hand gesture recognizer 103 recognizes that the gesture performed by the user is the pinch-out hand gesture.

The command acquirer 104 acquires the command associated with the hand gesture recognized by the hand gesture recognizer 103, from the HDD 92 (S12). Since the hand gesture recognized by the hand gesture recognizer 103 is the pinch-out hand gesture, the command acquirer 104 acquires the command indicating the pinch-out operation, as the command associated with the pinch-out hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the pinch-out operation), on the position of the cursor CR on the screen of the display device 473 (S13). Thus, the controller 100 performs the pinch-out operation, including enlarging the portion around the cursor CR, of the screen of the display device 473.

Figure 12B:
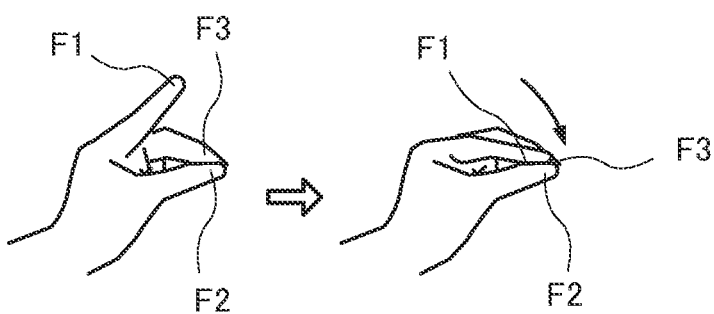
FIG. 12B is a schematic drawing showing a pinch-in hand gesture.

Hereunder, the case where the pinch-in hand gesture shown in FIG. 12B is performed at S10 will be described. FIG. 12B illustrates the pinch-in hand gesture. The pinch-in hand gesture shown in FIG. 12B refers to the gesture of making the thumb F2 and the middle finger F3 contact each other, and bringing the index finger F1 close to or into contact with the thumb F2 or the middle finger F3.

Upon recognizing that a hand gesture has been performed (YES at S10), the hand gesture recognizer 103 decides whether the motion locus of the thumb F2 and the middle finger F3 of the user's right hand being made to contact each other, and the index finger F1 being brought close to or into contact with the thumb F2 or the middle finger F3, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the pinch-in hand gesture stored in the HDD 92 (YES at S11). Thus, the hand gesture recognizer 103 recognizes that the gesture performed by the user is the pinch-in hand gesture.

The command acquirer 104 acquires the command associated with the hand gesture recognized by the hand gesture recognizer 103, from the HDD 92 (S12). Since the hand gesture recognized by the hand gesture recognizer 103 is the pinch-in hand gesture, the command acquirer 104 acquires the command indicating the pinch-in operation, as the command associated with the pinch-in hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the pinch-in operation), on the position of the cursor CR on the screen of the display device 473 (S13). Thus, the controller 100 performs the pinch-in operation, including reducing the size of the portion around the cursor CR, of the screen of the display device 473.

Figure 12C:
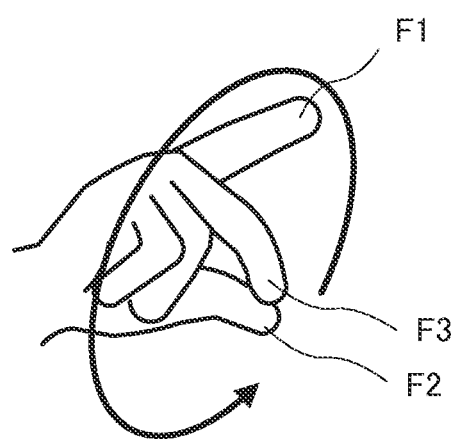
FIG. 12C is a schematic drawing showing a rotate hand gesture.

Hereunder, the case where the rotate hand gesture shown in FIG. 12C is performed at S10 will be described. FIG. 12C illustrates the rotate hand gesture. The rotate hand gesture shown in FIG. 12C refers to the gesture of making the thumb F2 and the middle finger F3 contact each other, keeping the index finger F1 away from the thumb F2 and the middle finger F3, and rotating the wrist to the right or left.

Upon recognizing that a hand gesture has been performed (YES at S10), the hand gesture recognizer 103 decides whether the motion locus of the thumb F2 and the middle finger F3 of the user's right hand being made to contact each other, the index finger F1 being kept away from the thumb F2 and the middle finger F3, and the wrist being rotated to the right or left, detected from the plurality of shot images provided by the camera 60, matches any of the loci representing the plurality of predetermined gestures stored in the HDD 92 (S11).

In this case, the hand gesture recognizer 103 decides that the mentioned motion locus matches the locus representing the rotate hand gesture stored in the HDD 92 (YES at S11). Thus, the hand gesture recognizer 103 recognizes that the gesture performed by the user is the rotate hand gesture.

The command acquirer 104 acquires the command associated with the hand gesture recognized by the hand gesture recognizer 103, from the HDD 92 (S12). Since the hand gesture recognized by the hand gesture recognizer 103 is the rotate hand gesture, the command acquirer 104 acquires the command indicating the rotate operation, as the command associated with the rotate hand gesture, according to the data table TB1 shown in FIG. 4.

The controller 100 identifies the corresponding position P2 where the cursor CR has stopped, using the information stored in the RAM (or HDD 92), in other words the information indicating the corresponding position P2 on the home screen where the cursor CR has stopped. In other words, the controller 100 identifies the cursor CR positioned immediately before the hand gesture has been performed. Then the controller 100 performs the operation corresponding to the command acquired by the command acquirer 104 (command indicating the rotate operation), on the position of the cursor CR on the screen of the display device 473 (S13). Thus, the controller 100 performs the rotate operation, including rotating the screen of the display device 473 to the right about the cursor CR, when the right wrist is rotated to the right, and rotating the screen of the display device 473 to the left about the cursor CR, when the right wrist is rotated to the left.

Referring again to FIG. 5, after S13 the controller 100 decides whether the hand gesture has finished (S14). For example, when the user's right hand H1 assumes the thumb-up shape, the controller 100 decides that the hand gesture has finished, when the hand gesture recognizer 103 recognizes that the user's right hand H1 is in the thumb-up shape from the shot image provided by the camera 60, or when the user moves away from the image forming apparatus 1 and is no longer detected by the user detection sensor 80 (YES at S14), and finishes the operation. In the case where the hand gesture of thumb-up is not detected, and the user continues to be detected by the user detection sensor 80 (NO at S14), the controller 100 proceeds to S6.

As described above, the image forming apparatus 1 according to this embodiment is capable of recognizing the hand gesture including the motion of the specific finger (index finger F1) and another finger (thumb F2) making contact with each other. The gesture performed by the user's hand raised up in the air includes the motion of the specific finger and another finger making contact with each other, and therefore tactile sensation, resultant from the physical contact between the specific finger and another finger, can be obtained. In other words, the tactile sensation can be obtained by operating the specific finger or another finger as if it were the touch panel surface, and therefore real feeling accompanies the operation through the hand gesture. Accordingly, the instability incidental to the operation through the hand gesture can be minimized, and consequently operation errors can be reduced.

In the case of the existing electronic device, referred to as the background art, the user performs the hand gesture in the air, without touching a touch panel or the like. Such a hand gesture, from which the tactile sensation is unable to be obtained, does not provide the real feeling of the operation. Therefore, the existing electronic device is unstable in the aspect of the operation through the hand gesture, and prone to incur an operation error. With the image forming apparatus 1 according to the foregoing embodiment, in contrast, the tactile sensation can be obtained from the hand gesture performed in the air, and therefore the instability of the operation through the hand gesture can be minimized, which leads to reduction in operation error.

When the command acquirer 104 acquires the command indicating the click operation, the controller 100 performs the click operation on the position of the cursor on the screen of the display device 473. In other words, when the user performs the click hand gesture, the click operation is performed on the position of the cursor on the screen of the display device 473. Accordingly, the tactile sensation can be obtained by operating the index finger F1 or the thumb F2 as if it were the touch panel surface, and therefore real feeling accompanies the operation through the click hand gesture. Consequently, the instability incidental to the operation through the click hand gesture can be minimized, which leads to reduction in operation error.

Likewise, when the command acquirer 104 acquires the command indicating the double-click operation, the controller 100 performs the double-click operation on the position of the cursor on the screen of the display device 473. In other words, when the user performs the double-click hand gesture, the double-click operation is performed on the position of the cursor on the screen of the display device 473. Accordingly, the tactile sensation can be obtained by operating the index finger F1 or the thumb F2 as if it were the touch panel surface, and therefore real feeling accompanies the operation through the double-click hand gesture. Consequently, the instability incidental to the operation through the double-click hand gesture can be minimized, which leads to reduction in operation error.

Likewise, when the command acquirer 104 acquires the command indicating the hold-down operation, the controller 100 performs the hold-down operation on the position of the cursor on the screen of the display device 473. In other words, when the user performs the hold-down hand gesture, the hold-down operation is performed on the position of the cursor on the screen of the display device 473. Accordingly, the tactile sensation can be obtained by operating the index finger F1 or the thumb F2 as if it were the touch panel surface, and therefore real feeling accompanies the operation through the hold-down hand gesture. Consequently, the instability incidental to the operation through the hold-down hand gesture can be minimized, which leads to reduction in operation error.

Likewise, when the command acquirer 104 acquires the drag command, the controller 100 performs the drag operation for selecting the rectangular range A1, defined by the starting corner SP1 corresponding to the cursor position on the screen of the display device 473, and the ending corner SP2 corresponding to the target position, located at the other end of the diagonal line drawn from the starting corner SP1. Then when the command acquirer 104 acquires the drop command, the controller 100 performs the drop operation including designating the rectangular range A1. In other words, when the user performs the drag-and-drop hand gesture (including drag gesture and drop gesture), the drag-and-drop operation is performed so as to establish the rectangular range A1 defined by the cursor position and the target position on the screen of the display device 473. Accordingly, the tactile sensation can be obtained by operating the index finger F1 or the thumb F2 as if it were the touch panel surface, and therefore real feeling accompanies the operation through the drag-and-drop hand gesture. Consequently, the instability incidental to the operation through the drag-and-drop hand gesture can be minimized, which leads to reduction in operation error.

Likewise, when the command acquirer 104 acquires the command indicating the swipe operation, the controller 100 performs the swipe operation including moving the screen of the display device 473 in the slide direction. In other words, when the user performs the swipe hand gesture, the swipe operation is performed so as to move the screen of the display device 473 in the slide direction. Accordingly, the tactile sensation can be obtained by operating the index finger F1 or the thumb F2 as if it were the touch panel surface, and therefore real feeling accompanies the operation through the swipe hand gesture. Consequently, the instability incidental to the operation through the swipe hand gesture can be minimized, which leads to reduction in operation error.

Likewise, when the command acquirer 104 acquires the command indicating the pinch-out operation, the controller 100 performs the pinch-out operation around the position of the cursor on the screen of the display device 473. In other words, when the user performs the pinch-out hand gesture, the pinch-out operation is performed around the position of the cursor on the screen of the display device 473. Accordingly, the tactile sensation, resultant from making the index finger F1, the thumb F2, and the middle finger F3 contact each other, and then separating only the index finger F1, can be obtained, and therefore real feeling accompanies the operation through the pinch-out hand gesture. Consequently, the instability incidental to the operation through the pinch-out hand gesture can be minimized, which leads to reduction in operation error.

Likewise, when the command acquirer 104 acquires the command indicating the pinch-in operation, the controller 100 performs the pinch-in operation around the position of the cursor on the screen of the display device 473. In other words, when the user performs the pinch-in hand gesture, the pinch-in operation is performed around the position of the cursor on the screen of the display device 473. Accordingly, the tactile sensation can be obtained by operating the thumb F2 and the middle finger F3 as if they were the touch panel surface, and therefore real feeling accompanies the operation through the pinch-in hand gesture. Consequently, the instability incidental to the operation through the pinch-in hand gesture can be minimized, which leads to reduction in operation error.

Likewise, when the command acquirer 104 acquires the command indicating the rotate operation, the controller 100 performs the rotate operation about the position of the cursor on the screen of the display device 473. In other words, when the user performs the rotate hand gesture, the rotate operation is performed about the position of the cursor on the screen of the display device 473. Accordingly, the tactile sensation resultant from making the thumb F2 and the middle finger F3 contact each other can be obtained, and therefore real feeling accompanies the operation through the rotate hand gesture. Consequently, the instability incidental to the operation through the rotate hand gesture can be minimized, which leads to reduction in operation error.

Further, the hand gesture recognizer 103 recognizes that a hand gesture has been performed, when the specific finger (index finger F1) and another finger (thumb F2) are made to contact each other within the predetermined time after the specific finger stopped, or when the moving speed or moving acceleration until the index finger and another finger are made to contact each other after the index finger stopped, is higher than a predetermined threshold. Therefore, the hand gesture that provides the tactile sensation, resultant from the contact between the specific finger and another finger, can be accurately recognized.

The disclosure may be modified in various manners, without limitation to the configuration according to the foregoing embodiment. For example, although the electronic device is exemplified by the image forming apparatus 1 in the embodiment, the disclosure is broadly applicable to electronic devices other than the image forming apparatus 1, such as a personal computer, a server, a mobile information terminal, and so forth.

Although the hand gesture is performed by the user's right hand in the foregoing embodiment, the user's left hand may be used instead.

Further, the configurations and processings described in the foregoing embodiments with reference to FIG. 1 to FIG.

12C are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a display device;
   a camera that shoots a user's hand raised up in the air;
   a control device including a processor, and configured to act, when the processor executes a control program, as:
      a finger position identifier that identifies a specific finger, from a shot image of the user's hand raised up in the air, provided by the camera, and identifies a position of the specific finger in the shot image; and
      a display controller that causes the display device to display a cursor on a screen, at a position corresponding to the position of the specific finger identified by the finger position identifier, and
   a storage device containing in advance a plurality of predetermined hand gestures including at least actions of the specific finger making contact with another finger, and commands respectively associated with the plurality of hand gestures,
   the control device being further configured to act, when the processor executes the control program, as:
      a hand gesture recognizer that recognizes a hand gesture, from a plurality of shot images sequentially acquired from the camera;
      a command acquirer that acquires the command associated with the hand gesture recognized by the hand gesture recognizer, from the storage device; and
      a controller that performs an operation according to the command acquired by the command acquirer, on the position of the cursor on the screen of the display device,
   wherein the specific finger is an index finger, and the other finger is a thumb,
   the storage device contains a drag-and-drop hand gesture including a drag gesture including making the index finger and the thumb contact each other and moving the hand to a target position keeping the index finger and the thumb in contact, and a drop gesture including separating the index finger and the thumb from each other at the target position, after the drag gesture, as one of the plurality of hand gestures, and a drag command indicating a drag operation and a drop command indicating a drop operation, as the command associated with the drag-and-drop hand gesture,
   the command acquirer sequentially acquires the drag command and the drop command associated with the drag-and-drop hand gesture recognized by the hand gesture recognizer, from the storage device, and
   when the command acquirer acquires the drag command, the controller performs the drag operation for selecting a rectangular range, defined by a starting corner corresponding to the cursor position on the screen of the display device, and an ending corner corresponding to the target position, located at an end of a diagonal line drawn from the starting corner, and performs, when the command acquirer acquires the drop command, the drop operation including designating the rectangular range.

2. An image forming apparatus comprising:
   the electronic device according to claim 1; and
   an image forming device that forms an image on a recording medium.

* * * * *